R. C. DUNN.
PLOW.
APPLICATION FILED FEB. 5, 1919.
1,309,468.
Patented July 8, 1919.
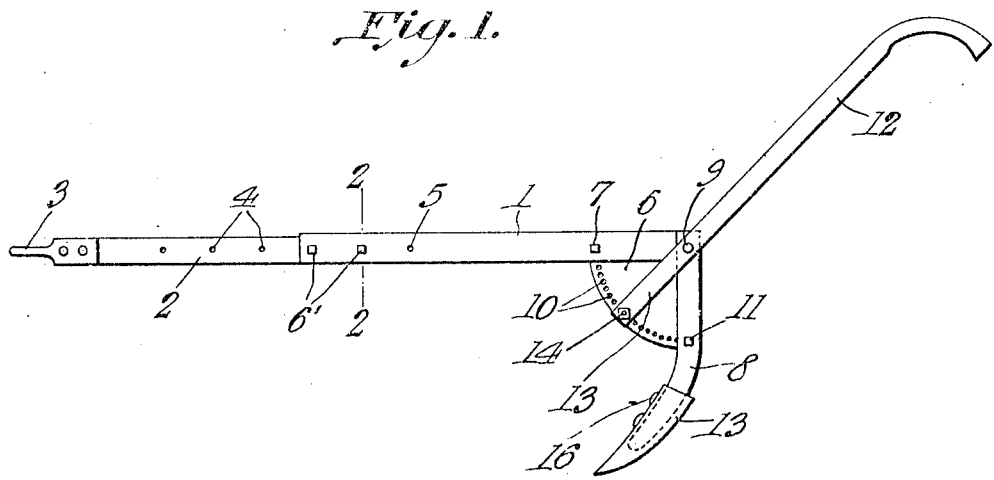
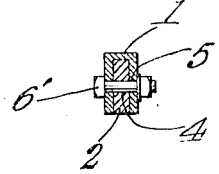
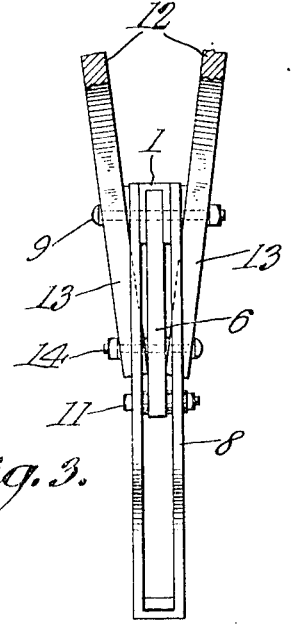
Inventor
Rufus C. Dunn
By Victor J. Evans
Attorney

UNITED STATES PATENT OFFICE.

RUFUS CLEAVELAND DUNN, OF VIDALIA, GEORGIA.

PLOW.

1,309,468.        Specification of Letters Patent.        Patented July 8, 1919.

Application filed February 5, 1919. Serial No. 275,235.

*To all whom it may concern:*

Be it known that I, RUFUS CLEAVELAND DUNN, a citizen of the United States, residing at Vidalia, in the county of Toombs and State of Georgia, have invented new and useful Improvements in Plows, of which the following is a specification.

This invention relates to improvements in plows and more particularly with reference to improvements in means for adjusting the handles so that the handles can be raised or lowered to suit the height of the plowman.

Another object of the invention is to effect improvements in the construction of the beam, so that the beam can be lengthened or shortened as may be required to cause the plow to run at any desired depth in the soil.

Another object is to provide means for pivoting and for adjusting the standard.

With the above and other objects in view, the invention consists in the construction, combination and arrangement of devices hereinafter described and claimed.

In the accompany drawings:—

Figure 1 is a front elevation of a plow constructed and arranged in accordance with my invention.

Fig. 2 is a transverse sectional view of the same on the plane indicated by the line 2—2 of Fig. 1.

Fig. 3 is a rear elevation of the same.

The beam of my improved plow is indicated at 1 and is made of channel iron and is substantially inverted U-shape in cross section. The beam is provided with a longitudinally adjustable member 2 which is arranged in the channel of the beam and is provided at the front end with a suitable clevis 3 for the attachment of the team.

The member 2 is provided with a suitable member of appropriately spaced adjusted openings 4. The beam 1 is also provided with openings 5, and suitable bolts 6' are inserted in said openings 5 and in certain of the openings 4, to secure the member 2 to the beam 1 at any desired longitudinal adjustment. This construction of the beam enables the same to be lengthened or shortened as required and hence enables the plow to be run at any desired depth in the soil.

At the rear end of the beam is a segmentally shaped adjusting brace 6 which is secured in the channel of the beam and extends downwardly therefrom. A suitable bolt 7 is herein shown for securing said brace. The standard 8 is U-shaped and is arranged with its members astride of and on opposite sides of the beam and the brace 6. A bolt 9 passes through the openings in the beam, the brace 6 and near the upper end of the members of the standard and said bolt forms a pivot for the standard and enables the standard to be arranged at any desired adjustment or angle with respect to the beam. The brace 6 is provided with a series of adjusting openings 10 which are arranged in an arc concentric with the pivot 9. A bolt or other similar device 11 is inserted in an opening in the standard and may be arranged in any of the openings 10 to secure the standard when adjusted. The handles 12 are arranged at opposite sides of the rear end of the beam and are pivotally mounted on the pivot 9. The handles have lower extensions 13 which are arranged on opposite sides of the brace 6. A bolt 14 passes through said extensions and may be inserted in any of the openings 10 to secure the handles at any desired adjustment. Hence the handles may be raised or lowered as desired and to suit the plowman.

Any suitable plow, shovel or earth working implement 13 may be secured on the front side of the standard as by means of a bolt 16, the bolt passing through the slot which is formed between the members of the standard and serving not only to secure the earth working implement but also to enable the same to be adjusted up or down as may be desired.

I have herein shown and described the preferred embodiment of my invention but I would have it understood that changes may be made in the form proportion and construction of the several parts without departing from the spirit of my invention and within the scope of the appended claims.

Having described the invention I claim:—

1. An implement of the class described comprising a beam, a standard depending therefrom, a bracing plate located at the junction of the standard with the beam, means for adjustably connecting the standard with said plate and handles pivotally connected with the beam and adjustably connected with the plate.

2. An implement of the class described comprising a beam, a standard depending therefrom, handles, a bolt passing through the said handles, the standard and beam for pivotally connecting the parts together and a bracing plate having a portion engaged by said bolt, means for adjustably securing the standard to said plate, and means for adjustably connecting the ends of the handles to said plate.

3. An implement of the class described comprising a channel beam, a segmental shaped bracing plate having one edge engaging the channel in said beam at the end thereof, a U-shaped standard having its ends overlapping the sides of the standard at the end thereof, handles, a bolt passing through the handles, the standard, the beam and the plate for pivotally connecting the parts together, said plate having perforations therein adjacent its rounded edge and bolts adapted to engage with some of said perforations and passing through said handle and standard for adjustably connecting said parts to the plate.

In testimony whereof I affix my signature.

RUFUS CLEAVELAND DUNN.

Copies of this patent may be obtained for five cents each, by addressing the "Commissioner of Patents, Washington, D. C."